Feb. 9, 1943.   L. H. SEMLER ET AL   2,310,322
LAWN RAKE
Filed May 16, 1941   2 Sheets-Sheet 1

Inventors:
Loren H. Semler,
Charles Rudolph,
By Dawson, Coms and Booth,
Attys.

Feb. 9, 1943. L. H. SEMLER ET AL 2,310,322
LAWN RAKE
Filed May 16, 1941 2 Sheets-Sheet 2
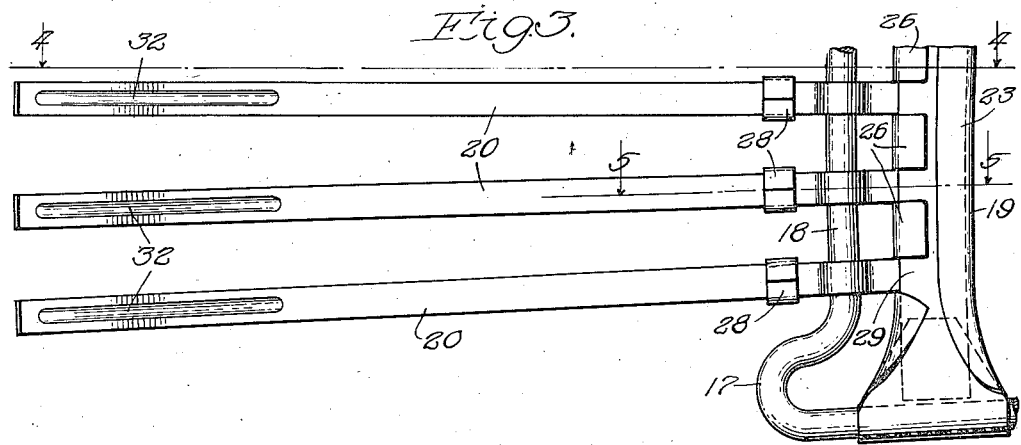
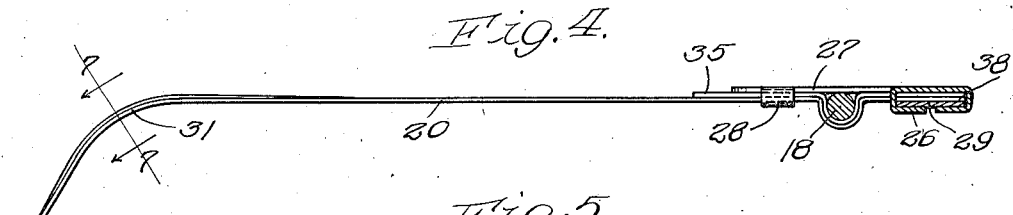
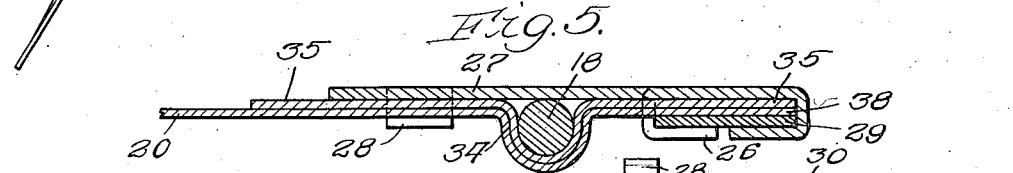
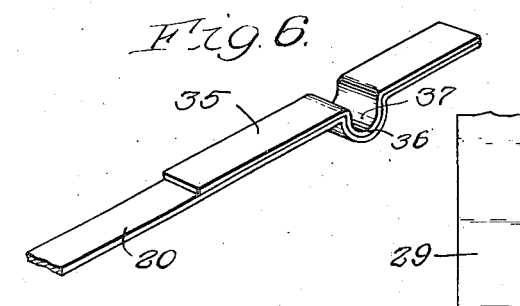
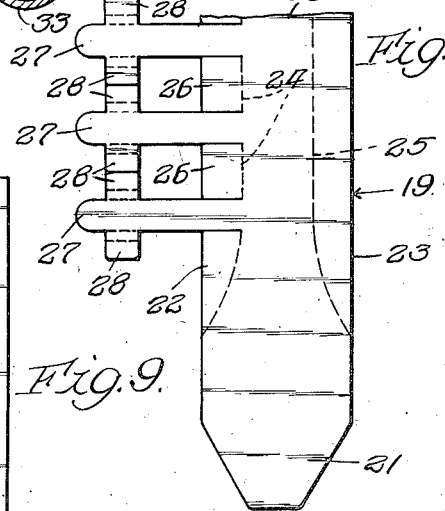
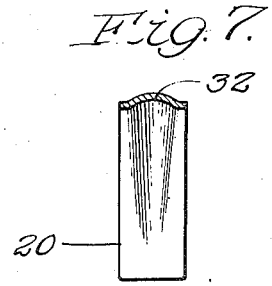
Inventors:
Loren H. Semler
Charles Rudolph,
By Dawson, Ooms & Booth,
Attys.

Patented Feb. 9, 1943

2,310,322

UNITED STATES PATENT OFFICE 2,310,322

LAWN RAKE

Loren H. Semler and Charles Rudolph,
Chicago, Ill.

Application May 16, 1941, Serial No. 393,713

12 Claims. (Cl. 56—400.17)

This invention relates to a lawn rake and more particularly to a rake wherein a plurality of tines are supported with maximum strength in a simple sturdy construction.

An object of the invention is to provide means for supporting the tines of the rake at spaced portions thereof. Another object is to provide a member for supporting one end of each of the tines and preventing lateral movement of the same. Still another object is to provide a member for supporting an intermediate portion of the tines and for locking the same against longitudinal movement. Yet another object is to provide in each of the tines of the rake a bend for receiving the supporting means and for holding the member in fixed engagement with the bent portion of the tine.

Another object of the invention is to provide means associated with a supporting member for holding the end of each of the tines in fixed engagement with the supporting member and simultaneously preventing lateral movement of the tines. A further object is to reinforce the portion of the tine which is subjected to the maximum strain. Another object is to provide in the frame of the rake, side portions which act as guards and also strengthen the construction. Yet another object is to provide a concave lateral surface adjacent the free end of each of the tines. A further object is to provide arcuate supporting members for the tines, each of the supporting members having a concave lower surface whereby the members possess a greater resistance to tension and also cause the tines adjacent the edge of the rake to engage the lawn before the center tines are brought into engagement therewith.

Other objects and advantages will appear from the following specification and drawings, in which—

Figure 1:
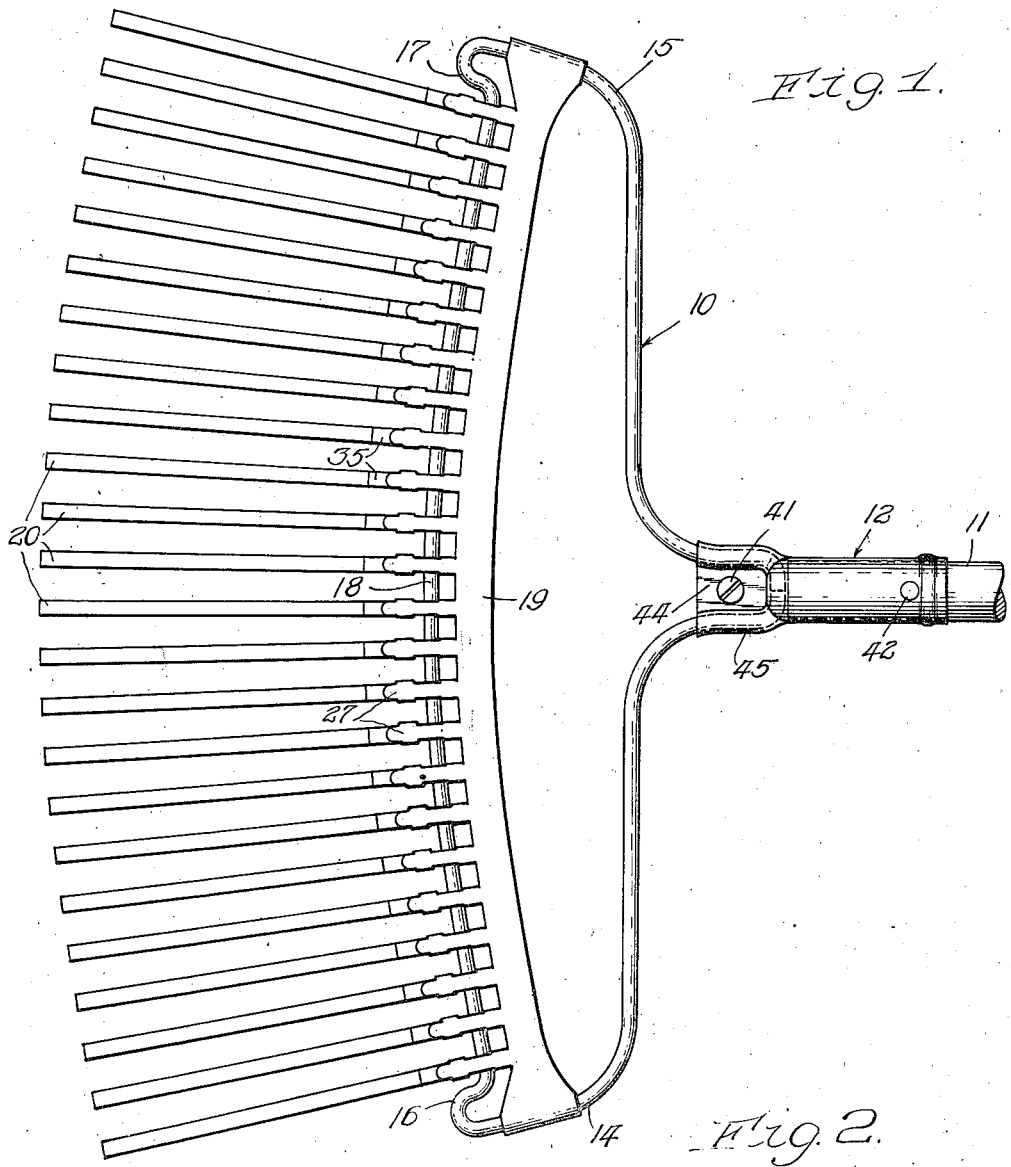
Figure 2:
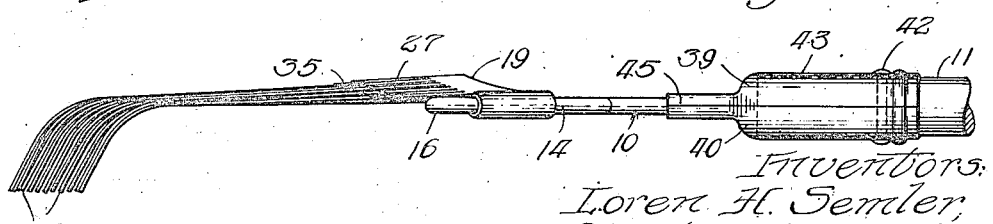

Figure 1 is a plan view of the rake with a portion of the handle broken away; Fig. 2 is a side elevational view of the same; Fig. 3 is a bottom plan view in detail of a portion of the rake; Fig. 4 is a vertical sectional view taken along the line 4—4 of Fig. 3; Fig. 5 is a similar sectional view taken along the line 5—5 of Fig. 3; Fig. 6 is a fragmentary detail perspective view of one of the tines and the reinforcing strip associated therewith; Fig. 7 is a transverse sectional view taken along the line 7—7 of Fig. 4; Fig. 8 is a plan view of a portion of the supporting member for the tines as it appears before assembly; and Fig. 9 is a plan view of a portion of the plate which is received within the supporting member shown in Fig. 8.

In the embodiment of the invention described herein, the rake is provided with a frame 10 which is attached to handle 11 by suitable means. As seen particularly in Figs. 1 and 2, the handle is preferably attached to the frame 10 by the bracket 12 which includes a pair of members 39 and 40 secured together by bolts or rivets 41 and 42. The members 39 and 40 are substantially identical, each being equipped at one end with a semi-circular hollow portion 43 and at the other end with a flat portion 44 having therein a groove or channel. The portions 43 when secured together form a cylindrical sleeve within which the handle 11 is received. The channels 45 removably receive the frame 10. If desired, the handle 11, as shown, may be united to the bracket 12. In this event, if the handle is broken, the frame 10 may be removed from the bracket 12 and a new handle and bracket may be substituted.

The frame 10 preferably consists of a steel rod which is bent as shown to provide a laterally extending surface for the mounting of the tines. The rod is bent to form side portions 14 and 15 which are turned backwardly and inwardly upon themselves at 16 and 17. The inwardly turned ends are integrally joined by a transverse bar or rod 18 which serves as one of the supporting members for the tines of the rake. Preferably the frame consists of a single rod which is thus bent and the ends of which are received, as shown, within the bracket 12.

A supporting member 19 extends between the side portions 14 and 15 of the frame 10 and is secured thereto in any suitable manner. The supporting member 19 is preferably spaced from the transverse member 18 in substantially parallel relation thereto. The supporting members 18 and 19 are slightly curved so as to provide an arcuate contour with the central portion of each of the members extending slightly upwardly from the ends thereof. As seen in Fig. 2, the members will thus be provided with slightly concave lower surfaces. By this arrangement the resistance of the members to tension exerted upon the tines is increased and at the same time the tines adjacent the ends of the members are disposed in a lower position so that they engage the lawn before the tines in the central portion of the rake. As shown in Fig. 1, the members 18 and 19 may also be curved slightly in the horizontal plane with the surface of the members which faces the handle of the rake being slightly concave.

The rake is provided with a plurality of tines 20 which are secured to the supporting members 18 and 19 and are spaced from each other along the members. Each of the tines is preferably supported at spaced longitudinal portions of the surface thereof by both of the members.

The member 19 as seen particularly in Figs. 3 and 8, may consist, before assembly, of a flat metal plate. The plate may be provided with a tapered portion 21 at each end thereof and with side portions 22 and 23 which may be scored at the dotted lines 23 and 25 or otherwise arranged so as to provide for bending of the plate along these lines.

The side portion 22 includes a plurality of spaced lugs 26 which are adapted to be turned backwardly upon the plate in the assembly of the rake. The plate is also equipped with a plurality of clamping members 27 extending laterally therefrom. Each of the clamping members is provided with a pair of clips 28 near the end thereof. The clamping members 27 are preferably formed integrally with the plate 19.

A flat plate 29 is adapted to be received on the central portion 30 of the member 19. This plate may be of metal and should be somewhat shorter than the member 19, preferably extending only to the ends of the bendable side portions 22 and 23 thereof.

The tines 20 may be made of flexible resilient metal strips; for example, they may be made of spring steel. Each of the tines as seen in Fig. 4 is turned downwardly to form an arcuate bend 31 near one end thereof. The downwardly turned portion of the tine is equipped with an arcuate lateral surface 32 as seen in Figs. 3 and 7. Each tine is thus provided with a laterally concave lower surface at the downwardly turned portion 31.

The other end of each of the tines 20 is brought into engagement at spaced portions thereof with the members 18 and 19. The end of each of the tines is flat and may be placed on the center portion 30 of the member 19. An intermediate portion 33 of each of the tines, spaced away from the end thereof by a distance substantially equal to the spacing of the members 18 and 19, is longitudinally bent to form a recess 34 within which the transverse bar 19 may be received. The recess, as shown, may be in substantially the form of a semi-circle and the arcuate portion of the tine is adapted to engage at least one-half of the peripheral surface of the bar 19.

If desired, a reinforcing strip 35 of a length slightly greater than the distance between the members 18 and 19 may be applied to each of the tines 20. The strip should be of substantially the same dimensions as the tines except as to length and is provided with a bent portion 36 forming an arcuate recess 37 which is adapted to be snugly received within the recess 34 of the portion 33 of the tine 20. When such a reinforcing strip is used, the recess 37 will receive the bar 19 and will engage the peripheral surface thereof. The recess 34 in the tine 20 will then be of slightly greater dimensions in order that it may engage the outer surface of the portion 36 of the reinforcing strip 35.

The tines 20 are assembled in the rake by placing the ends 38 thereof on the central portion 30 of the member 19. Preferably the tines are placed beneath the member 19. If the reinforcing strip 35 is to be used it is placed on the tine 20 and is received between the central portion 30 of the plate and tine 20. The plate 29 may then be placed beneath the end 38 of each of the tines 20. The lugs 26 are turned backwardly upon themselves to engage the plate 29 and the side portion 23 is similarly bent backwardly upon the plate 29. As seen in Fig. 3, when the lugs 26 and the side portion 23 are turned backwardly upon the plate 29, the plate is secured in position and holds the ends 38 of the tines 20 against the member 19.

Each of the tines is placed immediately beneath one of the clamping members 27. Preferably the tines and the clamping member 27 are substantially coextensive in width. This permits the lugs 26 when in backwardly turned position to engage the sides of the tines and prevent lateral movement of the tines with respect to the member 19.

The clamping members 27 extend from the member 19 a distance greater than the spacing of the members 18 and 19 so that each member 27 extends beyond the transverse bar 18. The clamping members 27 are disposed above the bar 18 while the tines 20 and reinforcing strips 30 are below the bar. The bar is received within the recess 37 of the strip 35. Preferably the recess is of such a depth that the upper surface of the reinforcing strip 35 is flush with the upper surface of the bar 18 and engages the lower surface of the clamping member 27. The clips 28 are turned downwardly and inwardly to enclose the reinforcing strip 35 and tine 20. This clamps the tines and reinforcing strips in fixed engagement with the clamping member and brings the tines and reinforcing strips into fixed engagement with the bar 18.

The arcuate portion 33 of the tine 20 and the corresponding portion 36 of the reinforcing strip 35 by extending around the bar 18 prevent longitudinal movement of the tine 20. The tines being secured to the members 18 and 19 are supported at spaced portions thereof and the tension exerted upon the free ends of the tines when the rake is in use is spread over this portion, thus decreasing the fatigue to which the metal of the tines is subjected.

Although the clamping member 19 may be secured to the side portions 14 and 15 of the frame 10 in any suitable manner, the member 19 as shown is attached to the side portions by bending the end 21 of the member around the side portion adjacent thereto to form a loop. The sides 22 and 23 of the member 19 are then turned inwardly upon themselves and overlie the looped end 21 of the member 19 to secure the same in position.

With the construction shown and described the rake may be completely assembled from substantially flat members without riveting or bolting the members together. The members are so arranged that by merely bending them they are interlocked and the tines are supported at spaced portions thereof by the two supporting members 18 and 19. At the same time, longitudinal movement of the tines is prevented by the engagement of the bar 18 with the arcuate recess in the tine and the lugs 26 prevent lateral movement of the tines.

The concave lower surface of the downwardly turned portion 31 of each of the tines affords additional strength at this point. The side portions 14 and 15 of the frame provide guards which prevent engagement of the tines with walls or other projections with which the rake may be brought into contact.

The interlocking arrangement of the tines 20, the reinforcing strips 35 and the clamping members 27 provides a triple support at the portion of the tines which is subjected to the greatest tension.

While in the foregoing specification there have been shown and described specific constructions embodying the invention it will be understood that changes and modifications may be made without departing from the spirit and scope of the invention.

We claim:

1. A lawn rake of the character described comprising a frame, a transverse bar mounted on said frame, a supporting member carried by said frame and spaced from the bar in substantially parallel relation thereto, clamping members carried by said member and extending therefrom beyond said bar, a plurality of flexible resilient tines each mounted at one end on said supporting member, means on said supporting member for locking each of the tines against lateral movement, each of said tines being in engagement with said bar, and means for securing each tine to a clamping member at a portion of the tine beyond said bar whereby each tine is held in engagement with said bar and locked against longitudinal movement.

2. A lawn rake of the character described comprising a frame, a transverse bar mounted on said frame, a supporting member carried by said frame and spaced from the bar in substantially parallel relation thereto, a plurality of clamping members carried by said member and extending therefrom beyond said bar and on one side thereof, a plurality of flexible resilient tines each mounted at one end on said supporting member and extending therefrom on the other side of said bar with each of the tines adjacent one of the clamping members, means on the supporting member for locking each of the tines against lateral movement, and means for securing each tine to the adjacent clamping member at a point beyond said bar whereby the tine is brought into engagement with the bar.

3. A lawn rake of the character described comprising, a frame, a transverse bar mounted on said frame, a supporting member carried by the frame and spaced from the bar, a plurality of flexible resilient tines each supported at spaced portions thereof by said bar and by said member, a portion of each of said tines being longitudinally bent to provide an arcuate recess for receiving said bar, a reinforcing strip adjacent each of said tines and extending between the member and the bar, said strip being bent to conform to the shape of the adjacent tine, means for holding the bar in said recess and for securing the tines and the reinforcing strip thereto to support the tines and lock the same against longitudinal movement, and means on said member for locking each of the tines against lateral movement.

4. A lawn rake of the character described comprising, a frame, a transverse member carried by the frame, a supporting member carried by the frame and spaced from the transverse member, a plurality of spaced lugs on said supporting member, a plurality of elongated tines each supported at one end on the supporting member between the lugs thereon, a plate extending across the supporting member locking the tines therebetween, the lugs being turned backwardly upon the plate to secure the same to the member and prevent lateral movement of the tines, and means for holding the tines in engagement with the transverse member.

5. A lawn rake of the character described comprising, a frame, a transverse bar mounted on said frame, a supporting member carried by the frame, a plurality of spaced lugs on said supporting member, a plurality of clamping members extending from said member between the lugs, a plurality of elongated resilient flexible tines, each of the tines overlying one of the clamping members and being supported at one end by the supporting member, the tines and the clamping members extending beyond said bar on opposite sides thereof, a plate extending across the supporting member for securing the tines thereto, the lugs being turned backwardly upon the plate to secure the same to the supporting member, and prevent lateral movement of the tines, and means for securing each of the clamping members to the tine overlying the same whereby the tine is brought into fixed engagement with said bar.

6. A lawn rake of the character described comprising, a frame, a transverse bar mounted on said frame, a supporting member carried by the frame, a plurality of spaced lugs on the supporting member, a plurality of clamping members extending from the supporting member between the lugs thereon, a plurality of elongated flexible resilient tines, each of the tines overlying one of the clamping members and being supported at one end by said supporting member, said tines and said clamping members extending beyond the bar on opposite sides thereof, the intermediate portion of each of the tines being longitudinally bent to provide a recess for receiving the bar, a plate extending across the supporting member for securing the tines thereto, said lugs being turned backwardly upon the plate to secure the same to the member and prevent lateral movement of the tines, and means for securing each of the clamping members to the adjacent tine to bring the recess in each of the tines into fixed engagement with said bar.

7. A lawn rake of the character described comprising, a frame, a transverse bar mounted on said frame, a supporting member carried by the frame and spaced from the bar, a plurality of flexible resilient tines each supported at one end by said member, the intermediate portion of each of said tines being longitudinally bent to provide an arcuate recess for receiving said bar, a reinforcing strip adjacent each of said tines, said strip being bent to conform to the shape of the adjacent tine, and means for securing each tine and the reinforcing strip therefor to said bar with the bar received within said recess.

8. In a lawn rake, a frame including a pair of side portions, each of said side portions being turned backwardly and inwardly to provide side guards, a transverse bar formed integrally with said side portions and extending between the inwardly turned ends of the same, a supporting member secured to and extending between said side portions, said member being spaced from the bar in substantially parallel relation thereto, and a plurality of elongated tines secured to said member and said bar.

9. In a lawn rake, a frame including a pair of side portions, a supporting member extending between said side portions, the ends of said member being turned backwardly upon themselves and looped around the side portions of the frame, and the sides of the member being turned backwardly upon and overlying the looped ends of the member to secure the same in position.

10. A lawn rake of the character described, comprising a frame, a transverse member carried by the frame, a supporting member carried by the frame and spaced from the transverse member, a plurality of elongated tines each supported at spaced portions thereof by said members, a plate extending across the supporting member locking the tines therebetween, means for preventing lateral movement of the tines with respect to the supporting member, and means for holding the tines in engagement with the transverse member.

11. A lawn rake of the character described, comprising a frame, a transverse bar mounted on said frame, a supporting member carried by the frame, a plurality of clamping members extending from the supporting member, a plurality of elongated flexible tines, each of the tines overlying one of the clamping members and being supported at one end by said supporting member, said tines and said clamping members extending beyond the bar on opposite sides thereof, the intermediate portion of each of the tines being longitudinally bent to provide a recess for receiving the bar, and means for securing each of the clamping members to the adjacent tine to bring the recess in each of the tines into fixed engagement with the bar.

12. A lawn rake of the character described, comprising a frame, a transverse bar mounted on said frame, a supporting member carried by the frame and spaced from the bar in substantially parallel relation thereto, clamping members carried by said supporting member and extending therefrom beyond said bar on one side thereof, a plurality of flexible resilient tines each supported at one end by said supporting member, each of said tines overlying one of the clamping members and extending beyond the bar on the other side thereof, the intermediate portion of each of said tines being longitudinally bent to provide an arcuate recess for receiving said bar, a reinforcing strip adjacent each of said tines, said strip being bent to conform to the shape of the adjacent tine, and means for securing each of the clamping members to one of the tines and the adjacent reinforcing strip to bring the recess in the tine into fixed engagement with the bar.

LOREN H. SEMLER.
CHARLES RUDOLPH.